United States Patent

[11] 3,621,205

[72] Inventor Wilburn F. Bradbury
Northbrook, Ill.

[21] Appl. No. 846,094
[22] Filed July 30, 1969
[45] Patented Nov. 16, 1971

[73] Assignee SCM Corporation
New York, N.Y.

[54] RECORD READER
21 Claims, 16 Drawing Figs.

[52] U.S. Cl. .......... 235/61.11 C
[51] Int. Cl. .......... G06k 7/08
[50] Field of Search .......... 235/61.11, 61.113, 61.114; 340/174.1; 178/17

[56] References Cited

UNITED STATES PATENTS 2,374,790 5/1945 Terry .......... 235/61.11 C
2,727,091 12/1955 Zenner .......... 235/61.11 C X
3,164,682 1/1965 Anderson .......... 179/100.2

*Primary Examiner*—Daryl W. Cook
*Attorney*—Mason, Kolehmainen, Rathburn & Wyss

ABSTRACT: There is disclosed a record reader having a plurality of sensing levers corresponding in number to the number of code hole positions across the record medium. Each sensing lever is associated with a magnetic circuit. In two embodiments the magnetic circuits are provided by electromagnets and in two other embodiments the magnetic circuits are provided by a permanent magnet. Each sensing lever moves when it senses the presence of a code hole and consequently the condition of its respective magnetic circuit is changed. Each magnetic circuit has an output circuit which generates one type of signal if the associated lever senses the presence of a code hole and another type of signal when it senses the absence of a code hole.

INVENTOR
WILBURN F. BRADBURY

Joseph J. Gross
ATTORNEY

RECORD READER

FIELD OF THE INVENTION

This invention relates to the art of record readers for reading code holes in a record medium such as tape or cards.

SUMMARY OF THE INVENTION

The invention resides in a novel record reader which has a small number of components, and is simple, easy to use, economical to manufacture, compact, and reliable. The reader can read perforations in conventional nonmagnetic records.

In carrying out the invention, there is provided a magnetic circuit corresponding to each code hole position. In two embodiments, the magnetic circuits associated with the sensing levers are provided by electromagnets and the sensing levers have armatures which either complete or break the respective electromagnetic circuits. The input winding can be pulsed with either direct or alternating current when the perforations in the record medium are in the reading position relative to the sensing levers, or either direct or alternating current when the perforations in the record medium are in the reading position relative to the sensing levers, or either direct or alternating current can be continuously applied to the input winding. In another embodiment, the magnetic circuits associated with the sensing levers include a permanent magnet and the sensing levers have armatures which complete or break the respective magnetic circuits. In yet another embodiment, the magnetic circuits are provided by the sensing levers which are permanent magnets and by respective magnetic bridges, so that when the sensing levers move in response to sensing code holes the conditions of the respective magnetic circuits are changed. In all the embodiments, each data bit output signal is preferably provided by an output winding inductively coupled to a respective magnetic circuit. The output windings can be connected to a suitable utilization device. As the magnetic circuits are disposed solely on one side of the record medium and as the sensing levers, except for their sensing projections which enter the code holes, are disposed solely on that one side of the record medium, record media of both the conventional perforated type and of the chadless type can be read, and yet reading is accomplished by simple structure.

The reader can be constructed almost entirely from sheet stock. In particular, the sensing levers and the plates which provide magnetic circuit paths, guiding, spacing and mounting functions can be blanked out using sheet stock. Moreover, a reader for reading a record having any selected number of code hole positions can be constructed using corresponding numbers of sensing levers and plates.

Each sensing lever has a sensing projection which is substantially narrower than the code hole and has a face with approximately the same contour as the contour of the trailing edge of the code hole. The terminal end of the sensing projection makes an acute angle with the face to enable the sensing projection to enter and leave the code holes easily.

The sensing rock directly on the pole of the magnet, thereby providing a continuous flux or circuit path.

Other features and objects of the invention will become apparent from the accompanying drawings and the following detailed description.

Figure 1:
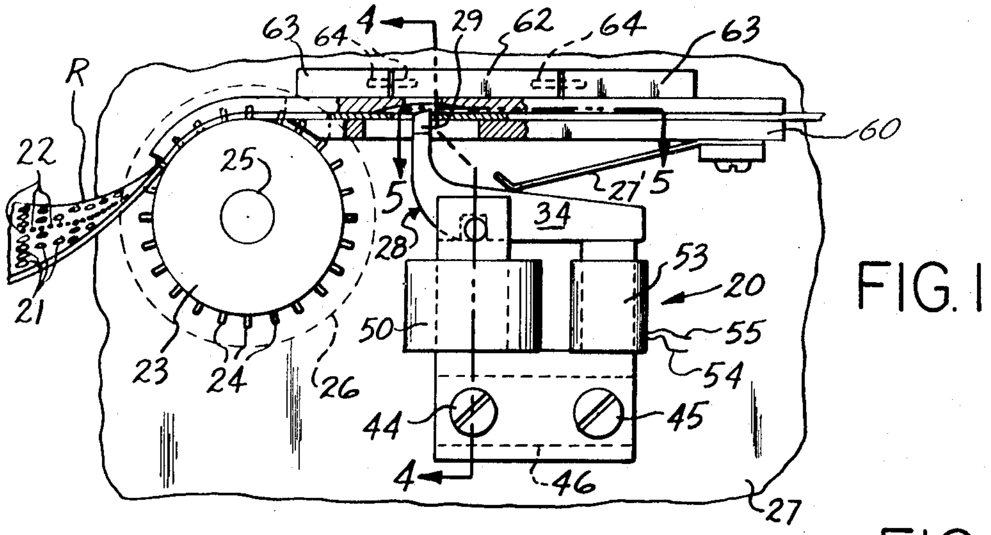
FIG. 1 is a side elevational view of a record reader in accordance with the invention, showing the sensing levers in one position.

Referring to the embodiment of FIGS. 1 through 10 of the drawings, there is shown a record reader generally indicated at 20 for reading code holes or perforations 21 in record medium R. The record medium R is illustrated as being a conventional code tape capable of having code holes 21 at any one of eight positions across its width, as well as feed holes 22 by which the code tape can be advanced.

A sprocket 23, having teeth or pins 24, is secured to a drive shaft 25. The drive shaft 25 is provided by the output shaft of an electric motor 26. The motor 26 can be a stepping motor, or a continuously rotating motor, if desired. The reader 20 and the motor 26 are secured to a frame 27.

Figure 2:
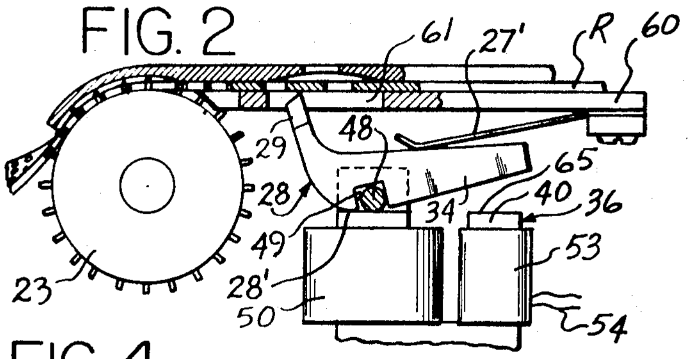
FIG. 2 is a fragmentary view of the record reader depicted in FIG. 1, but showing the sensing levers in another position.
Figure 3:
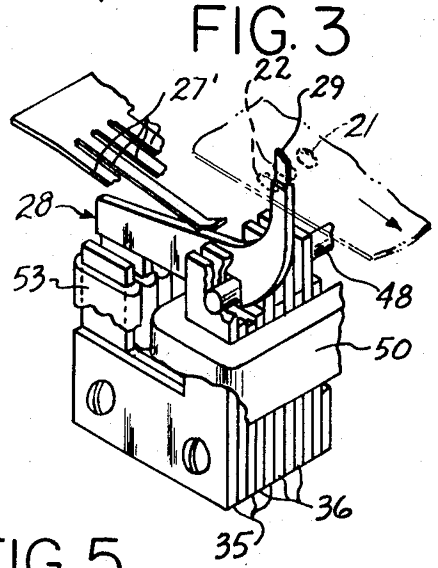
FIG. 3 is a perspective view of a fragmentary portion of the record reader, showing but one sensing lever.

The reader 20 has sensing levers 28 for sensing code holes at each code hole position across the record medium. The sensing levers 28 are shown to be flat and of one-piece construction. In the illustrated embodiment, the record medium R is provided with an eight-unit code requiring eight sensing levers. An additional sensing lever is illustrated (FIG. 4) as being in alignment with the feed holes 22. Inasmuch as that sensing lever 28 cannot enter the feed holes 22 it will be held in its counterclockwise position by the tape as illustrated in FIG. 2 so long as there is tape in the reader 20; thus, that lever 28 is used solely to sense an out-of-tape condition.

Figures 4, 5, 6:
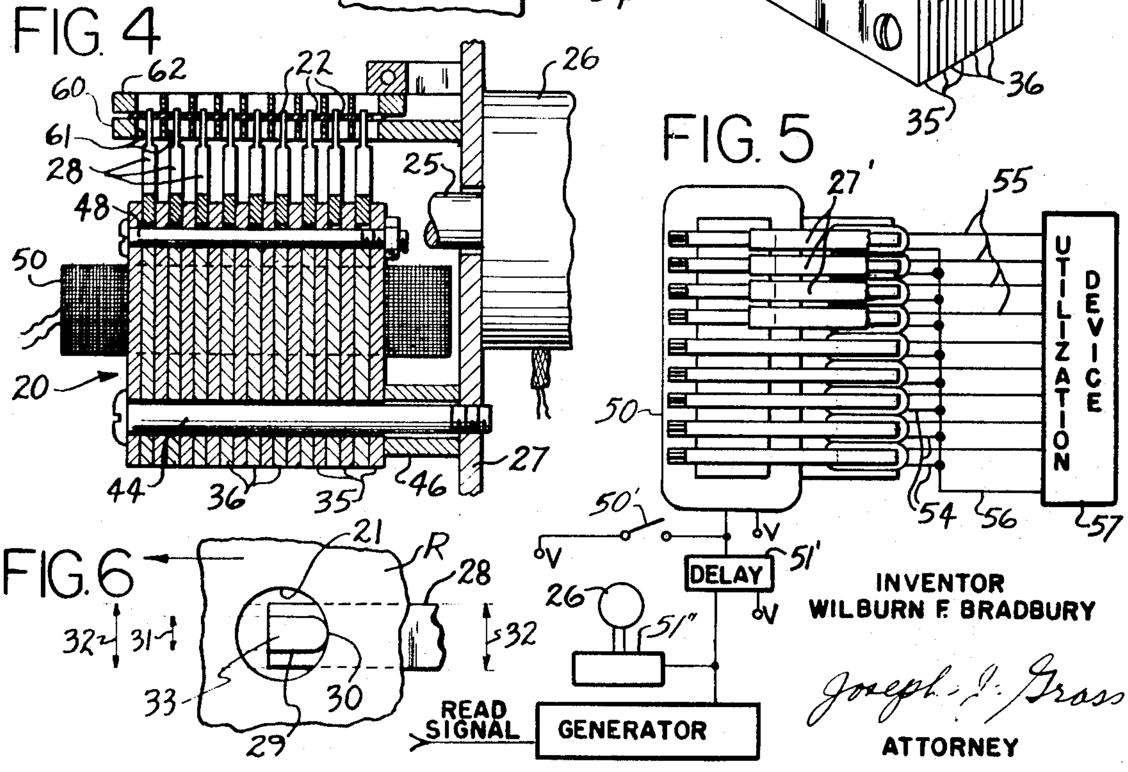
FIG. 4 is a sectional view taken along line 4—4 of FIG. 1.
FIG. 5 is top plan view taken generally along line 5—5 of FIG. 1.
FIG. 6 is a top plan view showing fragmentary portions of a conventional perforated record medium and sensing lever.
Figure 7:
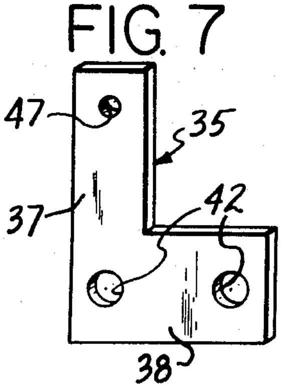
FIG. 7 is a perspective view of one of the U-shaped members shown in FIGS. 1 through 5.
Figure 10:
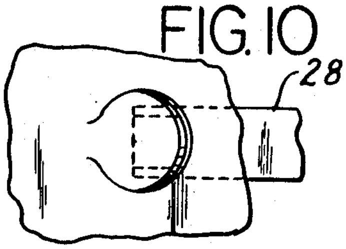
FIG. 10 is a top plan view showing fragmentary portions of the chadless tape and sensing lever shown in FIG. 9.
Figure 9:
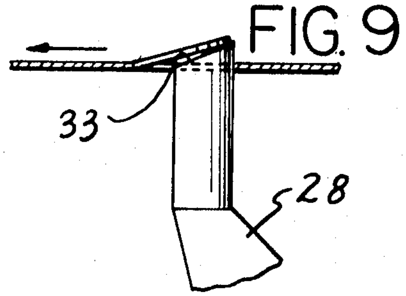
FIG. 9 is a side elevational view showing fragmentary portions of chadless tape and a sensing lever.

The sensing levers 28 are identical and hence only one will be described in detail. The lever 28 has a sensing projection 29 which is capable of extending through its associated code hole 21. The sensing projection has a face 30 having a contour corresponding approximately to the contour of the code hole 21. More particularly, the radius of the face 30 is preferably slightly less than the radius of the code hole 21, as best indicated at FIG. 6. The width of the sensing projection 29 as indicated at 31, is substantially less than the diameter of the code hole 21. In addition, the width of the sensing projection 29 as indicated at 31 is substantially less than the width of the remainder of the lever 28, as indicated at 32. The sensing projection 29 has a sloped terminal end 33 which makes an acute angle with the face 30 as best shown in FIG. 9. Although the terminal end 33 is shown to be flat for economy of manufacture it can have a radius with the center of the radius of curvature coinciding approximately with the pivot axis of the lever 28. The construction of the sensing projection 29 enables reading of code tape having the conventional type of code hole 21 as illustrated in FIG. 6, but also so-called chadless tape as illustrated in FIGS. 9 and 10. A typical illustration of chadless tape and its manufacture are disclosed in U.S. Pat. No. 2,255,794.

Figure 8:
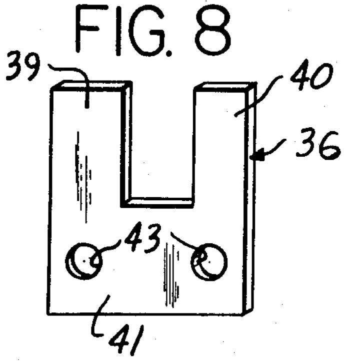
FIG. 8 is a perspective view of one of the L-shaped members shown in FIGS. 3 and 4.

Each sensing lever 28 also has an integral armature or magnetic bridge 34. The armature 34 forms part of a magnetic circuit or flux path. In addition to the sensing levers 28, the reader 20 is constructed using an alternate arrangement of identical, flat, L-shaped plates 35 (FIG. 7) and identical, flat, U-shaped plates or cores 36 (FIG. 8). Each L-shaped plate 35 has legs 37 and 38 and each U-shaped plate 36 has a pair of legs 39 and 40 joined by a bight 41. The legs 38 of the plates 35 and the bights 41 of the plates 36 have respective apertures 42 and 43. Bolts 44 and 45 extend through the holes 42 and 43 and are threadably received by the frame 27. When the bolts 44 and 45 are tightened they clamp the plates 35 and 36 together. A spacer 46 is disposed between the endmost plate 35 and the frame 27. The leg 37 of each plate 35 is longer than the leg 39 of each plate 36. Thus, the upper marginal portions of the plates 35 serve as guides between which the sensing levers 28 are guided for pivotal movement. The leg 37 of each plate 35 has a hole 47 through which a rod or retainer 48 extends. Each sensing lever 28 has a square grove 49 through which the retainer 48 extends. The rod 48 prevents the sensing levers 28 from being displaced as they rock between the position shown in FIG. 1 and the position shown in FIG. 2.

The sensing levers 28 are all considered to be pivotally mounted. In particular, it is the face at the pole of the core 36 on which rounded surface 28' of the respective lever 28 rocks. The sensing projection 29 moves in a curved path which is approximately arcuate. The levers 28 are biased clockwise (FIG. 1) by individual leaf springs 27' which are suitably secured to tape desk 60.

An input winding 50 is received about the legs 37 and 39 of the respective plates 35 and 36. The plates 36, and preferably also the plates 35, are composed of magnetic material. Cold-rolled steel is a suitable, low-cost material. A generator 51 is electrically connected to the winding 50 via time delay circuit 51' and to the motor 26 via motor control circuit 51''. Preferred operation is to apply to a read signal to the generator 51. The generator 51 in turn actuates the motor 26 via circuit 51'' and as soon as the record medium has been advanced to the reading position (FIG. 1) the delay circuit 51' applies an energizing pulse to the input winding 50. The pulse applied to the input winding 50 can be either a direct current pulse in the form of a spike or it can be an alternating current pulse. Such a spike or pulse can also be applied by operation of a switch 50', when it is desired to read the record R without advancing it. A particular advantage is that the electromagnet is only energized when the record medium is in the sensing position (FIG. 1); when the energizing pulse ceases to be applied to the winding 50, then the magnetic paths or circuits cease to exist and hence there is only residual magnetism, if any, in the respective circuit tending to hold the sensing lever in the position shown in FIG. 1. Accordingly, there is no need to overcome full magnetic field force in pivoting the levers 28 to the position shown in FIG. 2, as would be required when a permanent magnet is employed.

Each U-shaped member 36 forms a core of an electromagnet. The winding 50 is common to all the U-shaped members 36. The single winding 50 surrounds the legs 37 and 39 of the assembled plates 35 and 36. By energizing the winding 50 all the magnetic circuits are attempted to be established simultaneously. However, only those circuits which are complete will be full established. When any lever 28 is in the position shown in FIG. 1, its circuit is complete, and when the winding 50 is energized a magnetic circuit or flux path will be established. When any lever 28 is in the position shown in FIG. 2, its circuit is incomplete, and hence the circuit will not be fully established. Thus, each member 36 together with the armature 34 of the associated sensing lever 28 provides a complete magnetic circuit or flux path upon energization of the input winding 50 when the armature 34 is in the position shown in FIG. 1. Conversely, when the armature 34 of any sensing lever 28 is in the position shown in FIG. 2, that individual magnetic circuit is broken. A separate output winding 53 is electromagnetically coupled with each member 36 so each sensing lever 28 is associated with an individual core 36 and an individual output winding 53. Each winding 53 is wound about the leg 40 of a respective core 36. Assuming that the input winding 50 is energized, each armature 34 which is in the position shown in FIG. 1 will produce strong output data signal bits on conductors 54 of the associated output windings 53, and conversely all the armatures 34 which are in the position shown in FIG. 2 will cause only a negligible weak output signal to be applied to the conductors 54 of the associated output winding 53. It is apparent that the strength of each magnetic circuit is controlled by the position of the respective sensing lever 28. The output conductors 54 are connected to a common lead 56 which in turn is connected to the utilization device 57. The voltage levels applied to the conductors 55 are high whenever the associated sensing levers 28 sense code holes in the record medium R and conversely the voltage levels are negligible on those conductors 55 associated with sensing levers which do not sense code holes in the record medium R. Accordingly, the reader 20 reads the absence or presence of code holes at the different positions extending across the record medium R and translates the presence of a code hole into one type (large voltage) output data signal bit and the absence of a code hole into a different type (small voltage) output data signal bit. For example, if the first, second, and ninth sensing levers 28 (as counted from the left in FIG. 4) sense code holes 22, then these levers will pivot from the position shown in FIG. 2 to the position shown in FIG. 1. The remaining third, fourth, fifth, seventh, and eighth sensing levers 28 fail to sense a hole and hence they will remain in the position shown in FIG. 2. The sixth lever 28 will also remain in the position shown in FIG. 2 because the feed holes 22 are too small to allow entry of its sensing projection 29. The windings 53 associated with the respective first, second, and ninth levers sense one condition, whereas the windings associated with the respective second through eighth levers sense a different condition. Thus, the reader 20 reads the code holes and the absence of code holes in the record medium and translates this into a parallel data bit output signal. These two types of bits are distinguishable and are useable by the utilization device 57.

As is apparent from FIGS. 1 and 2, the record medium R is guided across the tape deck 60 which has cutouts 61 through which the sensing levers 28 extend. A tape holddown device 62 is secured to the frame 27 by hinge members 63 and hinge pins 64. The holddown plate 62 is held in the position shown in FIGS. 1 and 2 by a latch (not shown) during use, but the latch is releasable to enable the plate 62 to be pivoted to an upright position. The purpose of the plate is to prevent the levers 28 from lifting up the record medium. As the record medium is being held down by the plate 62, the record medium R serves to hold the levers 28 in the position shown in FIG. 2. Whenever a code hole 21 is presented to a lever 28, then that lever 28 can pivot from the position shown in FIG. 2 to the position shown in FIGS. 1, 3, 6, 9, and 10, thereby causing the armature 34 to move into abutment with pole face 65 of the plate or core 36. In this position, the face 30 of the sensing projection 29 is in engagement with the trailing edge of the associated code hole 21 as best indicated in FIGS. 6 and 9. When the record medium R moves, the trailing edge of the code hole 21 will cause the sensing lever 28 to pivot from the position shown in FIG. 1 to the position shown in FIG. 2. The sensing lever 28 will remain in the position shown in FIG. 2 until another code hole 21 is presented to H. Thereupon, it will again pivot into the position shown for example in FIG. 1.

Figure 11:
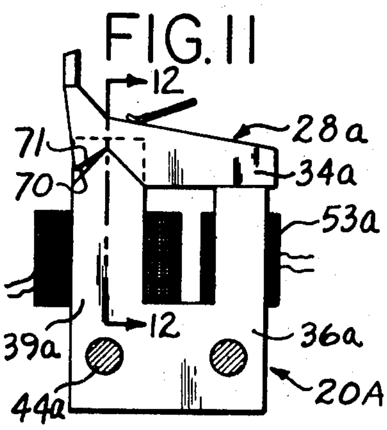
FIG. 11 is a side elevational view showing another embodiment of the reader, with a knife edge pivot connection for each respective sensing lever.
Figure 12:
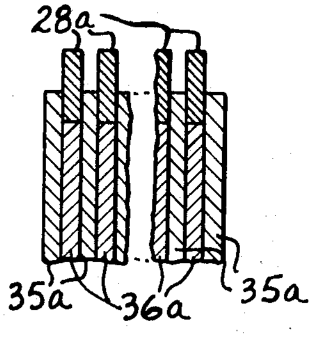
FIG. 12 is an enlarged, partly sectional view taken along 12—12 of FIG. 11.

The same reference characters are used in the embodiment of FIGS. 11 and 12 as in the embodiment of FIGS. 1 through 10 to designate components having the same general construction, function and relative location, with the addition of letter *a*. Reader 20A has sensing levers 28*a* pivotally mounted by generally U-shaped plates 36*a* by a knife edge pivot connection. The plates are spaced apart by generally L-shaped plates 35*a*. The upper marginal portions of the plates B5*a* extend sufficiently beyond the ends of the plates 36*a*to be in guiding relation with associated sensing levers 28*a*. In addition, adjacent plates 35*a*also provide magnetic circuit or flux paths between the plates 36*a*and the respective sensing levers 28*a*. This occurs because the plates 35*a*contact levers 28*a*as well as plates 36*a*, and because the plates 35*a*, as well as the plates 36a and levers 35a are composed of magnetic material. Each sensing lever 28a has a V-shaped groove 70. The plate or core 36a terminates at a V-shaped end 71. The angle of the end 71 is preferably only sufficiently greater than the angle of the groove to enable the lever 28a to pivot between the positions shown in FIGS. 1 and 2. This is preferred because this construction is conducive to a good magnetic circuit or flux path between the leg 39a of the core 36a and the armature 34a of the sensing lever 28a. There is no provision of a retaining rod as in the embodiment of FIGS. 11 and 12 as the cooperating V-shaped end 71 always seeks the vertex of the V-shaped groove 70.

Figures 13, 14, 15, 16:
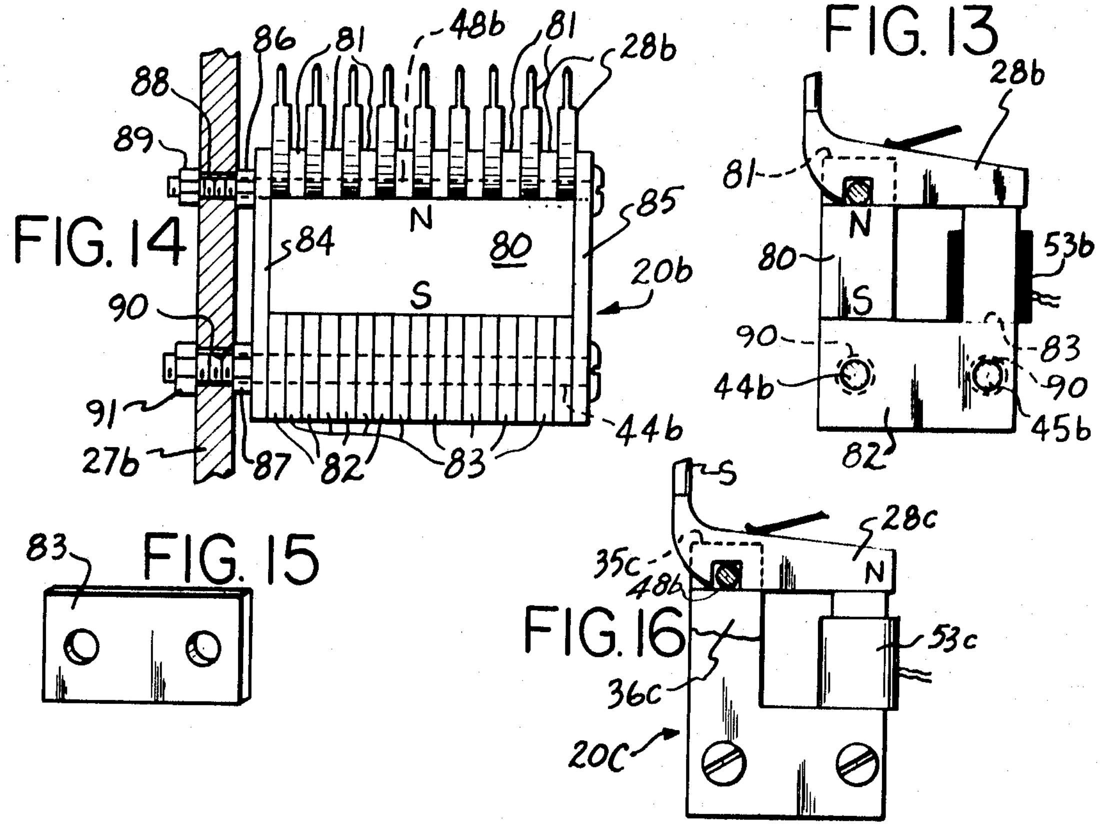
FIG. 13 is a side elevational view showing still another embodiment of the reader, in which the magnetic circuits include a permanent magnet.
FIG. 14 is a left end elevational view of the embodiment shown in FIG. 13.
FIG. 15 is a perspective view of one of the spacers shown in FIG. 14.
FIG. 16 is a side elevational view showing yet another embodiment of the invention, in which each sensing lever is a permanent magnet.

The same reference characters are used in the embodiment of FIGS. 13, 14, and 15 as in the embodiment of FIGS. 1 through 10 to designate components having the same general construction, function and relative location, with the addition of letter b. The reader 20B has sensing levers 28b pivotally mounted on and by one pole of a permanent magnet 80. The permanent magnet 80 is common to all the sensing levers 28b. Square plates 81 have respective holes through which the retaining rod 48b extends. The plates 81 are in contact with adjacent sensing levers 28b and with one pole of the permanent magnet 80. permanent plates 81 properly space the levers 28b apart, guide the levers 28a in their pivotal movements, and provide magnetic paths between the permanent magnet 80 and the adjacent sensing levers 28a because the plates 81 are composed of magnetic material. The reader 20B includes an alternating arrangement of L-shaped plates or magnetic bridges 82 and rectangular plates 83. The plates 82, which are in abutment with the other pole of the permanent magnet 80, are composed of magnetic material, but the plates 83 can as well be composed of nonmagnetic material. L-shaped end plates 84 and 85 have the same general construction as the plate 35 illustrated in FIG. 7. Assuming plates 81 and 83 have the same thickness, and that the sensing levers 28 b are slightly thinner than the plates 82 so that when the nuts 86 and 87 are tightened the levers 28b are able to pivot and yet the permanent magnet 80 and the plates 82 and 83 are rigidly clamped together. Each plate 82 forms part of a separate magnetic circuit which is completed when the respective sensing lever 28b is in the position shown in FIG. 13 and is broken when that sensing lever 28b is in the position of the lever 28 shown in FIG. 2. The permanent magnet 80 is common to each magnetic circuit. An output winding 53b is wrapped about a leg 84 of each plate 82.

Bolts 44b and 45b serve as tie rods, and the rod 48b serves as a tie rod in addition to being a retainer for levers 28b. The rod 48b extends through an enlarged hole 88 in frame 29b and a nut 89 threadably received by the rod 48b clamps the reader 20B to the frame 27b. The bolts 44b and 45b extend through enlarged holes 90 and a nut 91 is threadably received by each bolt 44b and 45b. Thus, the reader 20B can be removed from the frame 28b as a unit by removing nuts 89 and 91.

The same reference characters are used in the embodiment of FIG. 16 as in the embodiment of FIGS. 1 through 10 to designate components having the general construction, function and relative location, with the addition of letter c. The reader 20C is identical to the reader 20 except that each sensing lever 28c is a permanent magnet and input winding 50 is omitted. It is to be understood that it is not necessary that the entire lever 28c be a permanent magnet, but rather only such portion of the lever 28c need be a magnet as is necessary to effect generation of a data output signal bit. Each sensing lever 28c and its associated plate or magnetic bridge 36c are cooperable to provide a magnetic circuit when the respective lever 28c is in FIG. 16; as lever 28c is pivoted counterclockwise into the same position as occupied by the lever 28 in FIG. 2, its magnetic circuit is broken, thereby inducing a distinguishable voltage in the output winding 53c when the lever 28c pivots counterclockwise.

The reader, in its various embodiments, is mainly constructed of levers and plates that can be blanked out of sheet stock, such as cold-rolled steel. By way of example, not limitation: the plates or cores 36, 36a, 82 and 36c and plates 35, 35a, 83 and 35c have a thickness of about 0.050 inch and the sensing levers 28, 28a, 29b, and 28c have a thickness of about 0.048 inch.

The reader 20 can have a motor 26 which drives the record medium R continuously, in which event the generator can apply either direct or alternating current to the winding 50 continuously, and as the levers 28 move in response to sensing the presence of code holes 22, signal bits will be applied to output conductors 54.

I claim:

1. A record reader for reading code holes in a record medium, comprising: a plurality of cores, an input winding electromagnetically coupled to all of said cores, an individual output winding electromagnetically coupled to each respective core, means for energizing said input winding, a sensing lever individual to each core, each sensing lever including means for magnetically bridging the poles of the respective core to complete a magnetic circuit, and means mounting each sensing lever adjacent a different core for movement relative thereto to change its respective magnetic circuit during the sensing of each code hole to generate an output signal at its respective output winding.

2. A record reader for reading code holes in a record medium as defined in claim 1, each core being generally U-shaped and having a first leg and a second leg joined by a bight, a generally L-shaped member disposed between the first legs and the bights of adjacent U-shaped cores, said input winding surrounding all of said first legs of said U-shaped cores and said L-shaped members, each output winding being wound about the second leg of the respective U-shaped core.

3. A record reader for reading code holes in a record medium, comprising: a sensing lever for sensing successive code holes in the record medium, means mounting said sensing lever for movement between a first position and a second position, said sensing lever being held in the first position by the record medium in the absence of a code hole, and being moved to the second position by its entry into a code hole, and means formed in part by said sensing lever for providing a magnetic circuit, said magnetic circuit means having output means for providing an output signal each time said sensing lever moves between said first and second positions.

4. A record reader for reading code holes in a record medium as defined in claim 3, wherein said magnetic circuit includes a core, an input winding electromagnetically coupled to said cores and connected to a source of electrical energy, and an output winding electromagnetically coupled to each core.

5. A record reader for reading code holes in a record medium as defined claim 3, wherein there are a plurality of sensing levers and respective magnetic circuits, means for simultaneously attempting to electromagnetically establish all said magnetic circuits.

6. A record reader for reading code holes in a record medium as defined in claim 3, each magnetic circuit including a generally U-shaped member having a first leg and a second leg joined by a bight, a generally L-shaped member composed of magnetic material and being disposed between the first legs and the bights of adjacent U-shaped members, portions of said L-shaped members extending beyond the ends of said first legs of said U-shaped members, said sensing levers being disposed between and guided for movement by said portions.

7. A record reader for reading code holes in a record medium, comprising: means providing a magnetic circuit, means responsive to one condition of said magnetic circuit means for providing an output signal, a sensing lever including means forming part of said magnetic circuit means, means forming the remaining part of said magnetic circuit means, means mounting said sensing lever adjacent and for movement relative to said means forming the remaining part of said magnetic circuit means to effect a condition in said magnetic circuit means when said sensing lever senses the absence of a code hole in the record medium and to effect a different condition in said magnetic circuit means when said sensing lever senses the presence of a code hole in the record medium, and biasing means acting on the sensing levers for biasing the levers toward the record medium, the levers being moved against the biasing means by engagement with the record medium.

8. A record reader for reading code holes in a record medium as defined in claim 7, including two plates composed of magnetic material, one of said plates being in guiding engagement with one side of said sensing lever and the other plate being in guiding engagement with the other side of said sensing lever, said plates providing effective magnetic paths between said parts of said magnetic circuit means.

9. A record reader for reading code holes in a record medium as defined in claim 7, wherein there are code holes disposed at different positions across the record medium, and wherein for each position there is one said: magnetic circuit means, output means, sensing lever, and mounting means.

10. A record for reading code holes in a record medium as defined in claim 7, wherein said means forming the remaining part of said magnetic circuit includes a permanent magnet and a bridge composed of magnetic material, said sensing lever being magnetically cooperable with said bridge to complete the magnetic circuit when said sensing lever senses the presence of a code hole in the record medium.

11. A record reader for reading code holes in a record medium movable over a path comprising: a plurality of sensing levers disposed in parallel side-by-side relationship with respect to each other for sensing code holes in the record medium, means for movably mounting said levers in a given position adjacent the path for movement toward and away from the path, and a plurality of magnetic circuits, each magnetic circuit formed in part by a respective sensing lever.

12. A reader for reading code holes in a record medium as defined in claim 11, wherein said sensing levers are flat and are of one-piece construction.

13. A record reader for reading code holes in a record medium as defined in claim 11, including a core individual to each sensing lever, an input winding electromagnetically coupled to all of said cores, an individual output winding electromagnetically coupled to the respective core, each sensing lever including an armature cooperable with its respective core to provide an output signal from its output winding when that sensing lever senses a code hole in the record medium.

14. A record reader for reading code holes in a record medium, comprising: a sensing member having a sensing projection which is narrower than code hole, means mounting said sensing member for movement of its sensing projection in a curved path into and out of each code hole as the record medium moves, said sensing projection including a face having approximately the same contour as the trailing edges of the code holes which said face is adapted to engage, said sensing projection having a sloping end surface which makes an acute angle with said face, said sloping end surface enabling said sensing projection to readily enter and leave the code holes.

15. A record reader for reading code holes in a record medium, comprising: a sensing lever for sensing code holes in a record medium and including a magnetic portion, means for movably mounting said sensing lever, a permanent magnet for applying a magnetic bias to said magnetic portion, and means responsive to the position of said sensing lever and being under the control of said permanent magnet for generating an output signal when said sensing lever senses a code hole in the record medium.

16. A record reader for reading code holes in a record medium, comprising: a sensing member having a sensing projection and a first part of a magnetic circuit, and means pivotally mounting said sensing member to enable movement of said projection into and out of the code holes as the record medium moves, and a second part of the magnetic circuit with which said first part can magnetically coact, said second part of the magnetic circuit having signal output means for providing one type of signal when said sensing lever senses the presence of a code hole and another type of signal when said sensing lever senses the absence of a code hole.

17. A record reader for reading code holes in a record medium as defined claim 16, wherein said pivotal mounting means is a rocking connection between said sensing lever and said second part of the circuit.

18. A record reader for reading code holes in a record medium as defined in claim 16, wherein said pivotal mounting means is a knife edge connection.

19. A record reader for reading code holes at different positions across a record medium, regardless of whether it is of the conventional perforated type or of the chadless type, comprising: magnetic circuit means individual to each code hole position, said magnetic circuit means being disposed solely on one side of the record medium, control means individual to each magnetic circuit means for effecting a condition in its respective magnetic circuit means in the absence of a code hole in the record medium and for effecting a different condition in its respective magnetic circuit means in the presence of a code hole in the record medium, said control means being disposed solely on said one side of the record medium but having one and only one sensing member for entering the successively presented code holes along the respective code hole position, and signal output means responsive to the condition of each magnetic circuit means.

20. A record reader for reading code holes in a record medium, comprising: a plurality of magnetic circuit means each including a core, control means individual to each magnetic circuit means and mounted adjacent said magnetic circuit means for movement between two spaced positions in accordance with the record medium for effecting a different condition in its related magnetic circuit means in the presence of a code hole in the record medium, an input winding common to and electromagnetically coupled to all said cores, and a signal output winding individual to and electromagnetically coupled with each core.

21. A record reader for reading code holes in a record medium as defined in claim 20, including means for energizing said input winding when the conditions of said magnetic circuit means have been set.

* * * * *0